March 6, 1962     M. J. JENSEN     3,023,453
DUAL SHACKLE WITH AUTOMATIC RELEASE
Filed Nov. 14, 1958     2 Sheets-Sheet 1
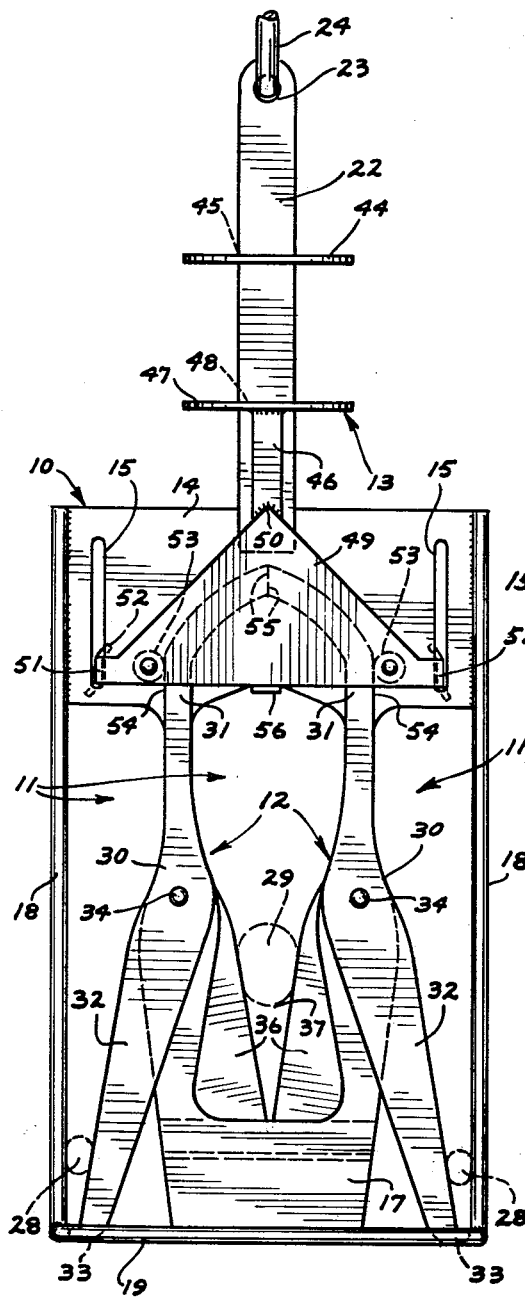
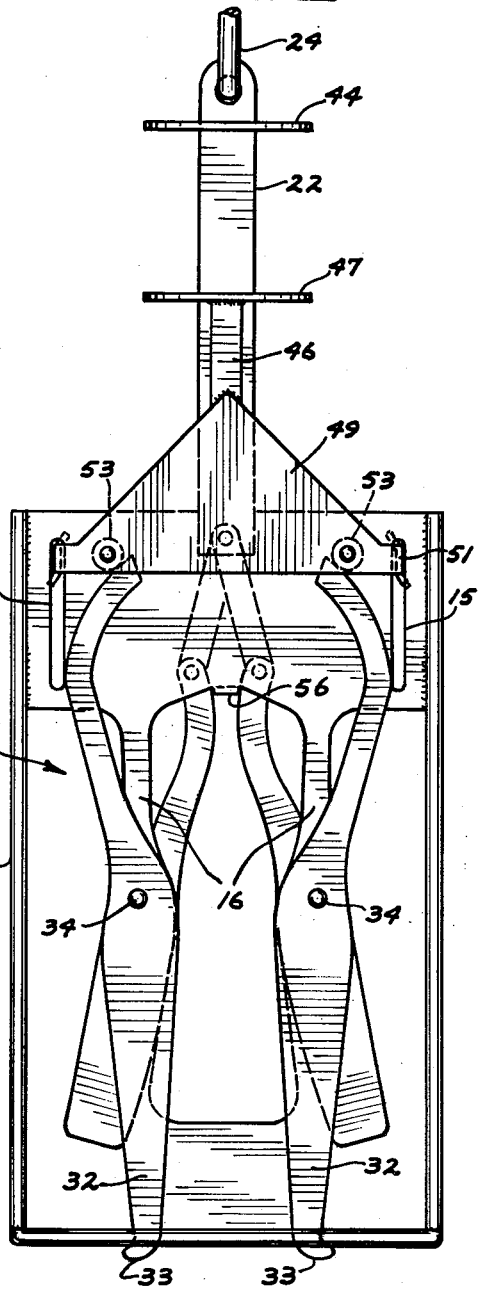
INVENTOR.
MELVIN J. JENSEN
BY
ATTORNEY

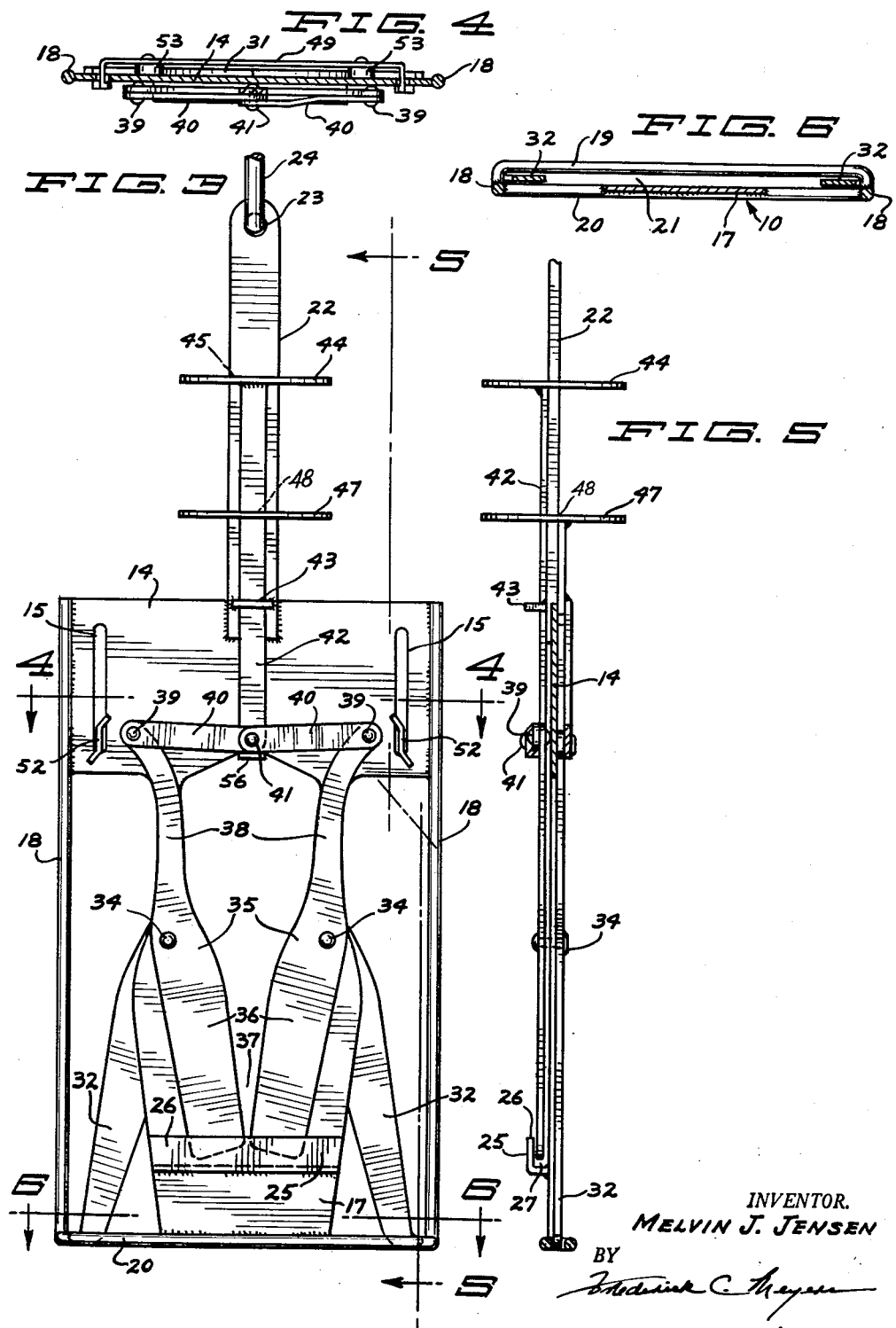

United States Patent Office 3,023,453
Patented Mar. 6, 1962

3,023,453
DUAL SHACKLE WITH AUTOMATIC RELEASE
Melvin J. Jensen, 41 S. 6th St., Barron, Wis., assignor of fifty percent to Wallace H. Jerome, Barron, Wis.
Filed Nov. 14, 1958, Ser. No. 774,032
8 Claims. (Cl. 17—44.1)

This invention relates to shackles, and more particularly to a dual shackle adapted to hold poultry for dressing and automatically to release the same when desired.

In dressing poultry on production scale, it is customary to suspend the individual birds on shackle devices depending from a traveling conveyor. The birds are placed on the shackles after being picked and after the feet and lower legs have been severed at the hocks. The bird may be suspended by the legs and by the head, following which incisions are made as a part of the dressing operation. For convenience, the head portion is first released and then the legs are released to drop the bird on a table before a worker where further procedural steps are taken. The birds are placed on their respective shackles by hand and, if they must also be removed by hand, considerable labor is so spent during each hour of production. It has heretofore been attempted to automatically release poultry from suspended condition on the shackles. The attempt, however, has not been successful because frequently the suspended bird would not be positively released and then the attention of a workman would be diverted from his regular work to a job of removing the bird by hand. The efficiency of the production line necessarily becomes lowered by such unscheduled hand operations.

Similarly, shackles have been employed which utilize spring wire and which present openings and protuberances which permit neighboring shackles on a conveyor to accidentally bump together and interlock. Here, again, an unscheduled hand operation must be resorted to in order to continue with the sequence of operation. Obviously, if the entire sequence is slowed or stopped, then the productivity of all the workers dependent thereon will be lessened.

It is within the contemplation of the present invention and a general object thereof to provide an inexpensive shackle which will be simple in design and positive in action, both in holding and releasing an article.

Another object of the invention is to provide a shackle which will have means for dual holding and releasing, the releasing being independently accomplished either consecutively or simultaneously.

A further object is to provide a shackle of the class described wherein all parts, whether in gripping or releasing position, will be incapable of interlocking with an adjacent shackle when freely suspended from a conveyor.

A still further object of the invention is to provide a poultry shackle having gripping means swingable to locked gripping position by gravity alone.

These and other objects and advantages of the invention will more fully appear from the following description, made in connection with the accompanying drawings, wherein like reference characters refer to the same parts throughout the several views and in which:

FIGURE 1 is a front elevation of my shackle showing the arms and jaws locked in holding position;

FIGURE 2 is a front elevation similar to FIGURE 1, showing the jaws and arms in releasing position;

FIGURE 3 is a rear elevation with the arms and jaws in the same position as shown in FIGURE 1;

FIGURE 4 is a horizontal section taken on the line 4—4 of FIGURE 3;

FIGURE 5 is a vertical section taken on the line 5—5 of FIGURE 3; and

FIGURE 6 is another horizontal section taken on the line 6—6 of FIGURE 3.

With continued reference to the drawings, my invention basically comprises an upstanding frame 10 having a plurality of openings 11 formed laterally therethrough, lever means 12 pivotally mounted on the frame 10 so as to be swingable restrictively across the openings 11, and actuator means 13 adapted to move the lever means 12 to its opening restrictive position and lock the same without springs or other resilient elements, the actuator means so functioning to close and lock the lever means by gravity alone.

The frame 10 has a plate 14 at its upper portion, the latter being provided with a pair of spaced vertical slots 15, one at each side of the plate 14. Plate 14 has a pair of narrow depending strips 16, as shown in FIG. 2, which extend downwardly and connect with the lower plate 17, as shown in FIG. 1. Rod members 18 form the sides of frame 10 and are secured to the upper plate 14 and extend downwardly in spaced parallel relation as shown in FIGS. 1, 2 and 3. The bottom edge of frame 10 comprises a pair of rods 19 and 20, as shown in FIGS. 1, 3 and 6. Rods 19 and 20 are joined at their ends to respective side rods 18 and lie in closely spaced parallel relation for the width of the frame 10 for the purpose of guarding moving parts which will be described in detail later in this specification.

The upper portion of the frame has means such as the hanger 22 rigidly secured to the upper plate 14 and provided with an opening 23 for suspending from a conveyor hook 24 or the like.

Also secured to the frame 10 at the lower base portion 17 is a flange 25 having an upstanding lip portion 26 spaced rearwardly from the lower plate 17 and defining a protective groove or channel 27, the function of which will be described later. The heavy rods 18, 19 and 20 may be welded or otherwise secured to the plates 14 and 17 as well as to one another as shown in the drawings.

When my shackle is adapted to suspend poultry, the outermost of the openings 11 may be used for the legs and the central opening used for the head portion during the dressing operation. Referring to FIG. 1, the position of the legs is indicated by the dotted line cross section 28 and the head or neck portion by 29.

The lever means 12 comprises, in part, a pair of arms 30 having upper camming portions 31 and depending free-ended gripping portions 32 at the lower ends as shown. The lowermost portion of the depending portion 32 may be provided with abutment feet 33, as shown in FIGS. 1 and 2. Arms 30 are pivoted at respective points 34 intermediate the upper and lower plates 14 and 17 through the connecting bands or strips 16. Lower arm portions 32 are thus pivotally movable in a plane close to that defined by the frame 10 in such a manner as to partially restrict the respective outside openings 11 and to hold and entrap poultry legs 28 in the lower portion of the openings 11 when suspended from the shackle. As viewed in FIGS. 1 and 2, the arms 30 lie forwardly of the plates 14 and 17 with the feet 33 received within the slot 21 so as to be guarded and protected by lower rod members 19 and 20 and thereby not present sufficient protuberance to catch and extend into a neighboring shackle during use.

Also providing a part of the lever mechanism 12 are the jaw members 35 which may be conveniently secured to pivots 34 and thereby being pivotable about the same axis as the respective arms 30. Jaws 35 have depending lower portions 36 which are adapted to swing convergently into the central opening 11 and thereby form a V-shaped slot 37, as shown in FIGS. 1 and 3. Upper portions 38 of the respective jaws 35 are pivotally secured at 39 to respective links 40 which are overlapped and mutually joined at the pivot 41, in turn secured to the actuator rod 42. Actuator rod 42 is slidably received in the guide 43 which is, in turn, mounted upon the hanger 22 and slides flatly thereagainst during operation. The actuator rod 42 terminates upwardly in an abutment means such as a horizontal plate 44 and has a medial opening 45 which surrounds the hanger 22, as shown.

Opposite the actuator rod 42, as shown in the front views of FIGS. 1 and 2, is the remaining portion of the actuator mechanism 13. The portion shown in FIGS. 1 and 2 is adapted to actuate the arms 30 and constitutes a short actuator rod 46 terminating upwardly in an abutment means such as actuator plate 47 which has a medial opening 48 through which extends not only the hanger 22 but also the actuator rod 42 previously described. The lower portion of the actuator rod 46 is secured to a triangular plate 49 at the upper apex as by welding 50. At each side of the face of triangular plate 49 is formed a bent ear portion 51 which extends through respective slots 15, each being provided with bent tabs 52 and interlocked slidably in grooves 15. Pivotally secured to the back face of the triangular plates 49 are a pair of roller members 53, each adapted to engage cam portion 31 at the upper end of an arm 30. In the position shown in FIG. 1, the rollers 53 lie in their locking position in engagement with the straight portion 54 of the upper cam ends 31. When the arms 30 are locked, their very uppermost curved ends 55 will lie in abutted relation, thereby limiting the degree to which the lower arm portions 32 will swing outwardly. Abutting feet 33 at the lowermost portions of arms 32 also provide limiting abutments to prevent the further outward swinging of the lower portion of arms 32. The means for limiting the convergent swinging of jaws 36 may reside in the bracket 56 secured to, or formed from, the upper plate 14 and extending forwardly, as shown in FIG. 3, to underlie the actuator arm 42 and limit its downward movement.

In the use and operation of my shackle, the actuator plates 44 and 47 are permitted to assume their lowermost position, as shown in FIGS. 1 and 3. Since the rollers 53 will then be in contact with the straight portion of the camming edge 54, the lowermost portion of arms 32 will lie outwardly and converge toward the outermost side wires 18 for firmly engaging and wedging legs 28, as shown in FIG. 1. The greater the pressure upon the lower portions 32, the more firmly will the legs be wedged and, in no event, will the arms 30 swing inwardly as long as the rollers 53 lock them in place. Referring to FIG. 3, the actuator rod 42 will also be in lower position causing links 40 to lie in straight alignment when the rod 42 abuts the bracket 56. Lower portions 36 of jaws 35 will then be in the converging position shown in FIGS. 1 and 3 so that the neck 29 of a bird may be inserted therein. Since links 40 are in alignment, or slightly over dead-center, pressure against the lower portions 36 of jaws 35 will not spread them apart.

It will be noted that the feet 33 of arm 30, as well as the lower portion 36 of jaws 35, will be guarded in such a manner that they cannot catch either in portions of the bird or in portions of a neighboring shackle.

When it is desired to release the legs, the actuator plate 47 is raised, thus sliding triangular plate 49 upwardly and permitting the rollers 53 to follow the upper curved portion of camming edge 54. The arms 30 will then rock so that their lower portions 32 will converse and freely uncover the outer openings 11 to permit legs 28 to drop from the openings. It will be noted that arms 30 are so constructed and arranged and pivoted at such a point that gravitational influence will tend to rotate the arms from the position shown in FIGURE 1 to that shown in FIGURE 2 when the rollers 53 are raised. Also, the legs 28 exert a force against the lower portions 32 so as to assist in the movement of arms 30 against rollers 53 where they will remain even after the bird has been dropped from the shackle by gravity. Similarly, raising the actuator plate 44, as shown in FIG. 2, will cause the lower jaw portions 36 to diverge and uncover the middle opening 11 to permit the neck and head portions 29 of the bird to drop from the shackle. It is understood that mechanical means (not shown) may be employed to raise either or both of the actuator plates 44 and 47. Whenever the actuator plates 44 and 47 are released, the respective arms 30 and jaws 35 will again be moved to opening-restricting position where they will be locked and ready to receive the legs and neck of another bird. The periphery of frame 10 is continuous and smooth and the moving parts of the shackle lie in flat compact relation as seen in FIG. 5. Whether the arms and jaws are closed as viewed in FIGS. 1 and 3, or open as viewed in FIG. 2, there is no opportunity for the shackles to become interlocked or otherwise entangled. When the arms and jaws are opened, as in FIG. 2, the openings 11 are free and unobstructed so that each bird will be freely and cleanly released from its shackle. In normal operation, it is intended that the jaw portions 36 be separated first to release the head, whereupon the actuator plate 44 is released and returned to its original locked position prior to the time that the arms 30 are moved convergently at the lower portions to release the remainder of the bird. The positive and reliable action of the shackles insures considerable savings in labor over those shackle arrangements which require manual attention to release the birds and reset the moving parts.

It will, of course, be understood that various changes may be made in the form, details, arrangements and proportions of the parts without departing from the scope of my invention, as set forth in the appended claims.

What I claim is:

1. A dual poultry shackle comprising, a base frame having a plurality of openings therethrough and having means for suspending in upright position, a pair of arms pivotally secured to the frame, each adjacent one side of an opening and swingable thereacross toward an opposite side of its respective opening, a pair of jaws pivotally secured to the frame in confronting relation at opposed sides of another opening and swingable convergently to restrict said opening, arm actuating means shiftably mounted with respect to the frame and adapted to shift said pair of arms away from its respective associated opening for releasing poultry legs therefrom, and jaw actuating means shiftably mounted with respect to the frame and adapted to shift said pair of jaws divergently from their associated openings for releasing poultry heads therefrom, each of said arms being pivotally secured at the same point as a jaw and being swingable in opposite directions to effect releasing of the bird.

2. A shackle for hanging and releasing fowls and the like comprising, an upstanding frame, support means secured to said frame and adapted to suspend the same in an upright position, shiftable means mounted on said frame and normally lying substantially within the periphery thereof, said shiftable means defining a gripping means when shifted toward said frame and permitting release when shifted away therefrom, and actuator means connected to said shiftable means for actuating the same, said frame being smooth and free of outwardly extending protuberences whereby to prevent interlocking of a shackle with another similar shackle when suspended adjacent thereto.

3. The shackle set forth in claim 2 wherein the said shiftable means has provision for holding both the head and feet of a fowl.

4. The shackle set forth in claim 3 wherein the actuator means coacts with said shiftable means to independently release the head and feet of a fowl.

5. The shackle of claim 4 wherein said actuator means includes a pair of actuator plates slidably mounted on said support means.

6. A poultry shackle device comprising, a base frame having an opening therethrough adapted to receive an extremity of a fowl, a hanger element secured to the base frame and adapted to extend upwardly therefrom for securing to a conveyor member, arm means shiftably mounted upon the frame adjacent one side of said opening and shiftable thereacross toward the opposite side of the opening to retain poultry extremities gripped therein, arm actuating means connected to said arm means and adapted to shift the arm means away from the opposite side of the associated opening for releasing the fowl therefrom, said actuating means being slidably mounted on said hanger element and having an abutment plate adapted to be engaged for effecting movement of said actuating means.

7. The shackle device set forth in claim 6 wherein said base frame and said arm means lie substantially in the same plane.

8. A poultry shackle comprising, a base fame having a plurality of openings therethrough, a hanger element secured to the base frame and adapted to extend upwardly therefrom for securing to a conveyor member, arm means shiftably mounted upon the frame adjacent one side of a first opening and movable thereacross toward the opposite side of the opening, jaw means shiftably mounted upon the frame adjacent one side of a second opening and movable thereacross toward the opposite side of said second opening, arm actuating means slidably mounted with respect to the frame and adapted to shift the arm means away from the opposite side of its associated opening for releasing poultry legs therefrom, jaw actuating means slidably mounted with respect to the fame and adapted to shift the jaw means away from the opposite side of its associated opening for releasing poultry heads therefrom, each of said actuating means being slidably mounted on the hanger element and each having an abutment plate adapted to be engaged individually for effecting respective actuation of said arm means and said jaw means.

References Cited in the file of this patent
UNITED STATES PATENTS

| | | |
|---|---|---|
| 1,019,086 | Quinn | Mar. 5, 1912 |
| 2,644,981 | Crane | July 14, 1953 |
| 2,739,347 | Sharp et al. | Mar. 27, 1956 |
| 2,797,436 | Shadley | July 2, 1957 |